United States Patent [19]

Lepeytre et al.

[11] 3,881,696

[45] May 6, 1975

[54] CATALYST FOR CLEANING ENGINE EXHAUST GASES

[75] Inventors: Jean-Michel Lepeytre, Tarbes; Claude Paul; Louis Grandet, both of Toulouse; Louis Minjolle, Tarbes, all of France

[73] Assignees: Azote et Produits Chimiques, S.A., Toulouse; Ceraver, Paris, both of France

[22] Filed: Feb. 23, 1973

[21] Appl. No.: 335,125

[30] Foreign Application Priority Data

Feb. 23, 1972  France .............................. 72.06018

[52] U.S. Cl. ............. 252/455 R; 252/457; 252/465; 252/466 B; 423/213.2; 423/213.5
[51] Int. Cl. ........................ B01j 11/06; B01j 11/22
[58] Field of Search ......... 252/466 B, 466 J, 455 R, 252/457; 423/213.2, 213.5

[56] References Cited
UNITED STATES PATENTS

| | | |
|---|---|---|
| 2,071,119 | 2/1937 | Harger .............................. 423/213.2 |
| 3,112,277 | 11/1963 | Michalko ........................ 423/213.2 |
| 3,230,182 | 1/1966 | Stiles................................. 252/465 |
| 3,259,589 | 7/1966 | Michalko ..................... 252/466 PT |
| 3,397,154 | 8/1968 | Talsma............................. 423/213.2 |
| 3,699,683 | 10/1972 | Tourtellotte et al............. 423/213.2 |
| 3,741,725 | 6/1973 | Graham ........................... 423/213.7 |

*Primary Examiner*—Winston A. Douglas
*Assistant Examiner*—W. J. Shine
*Attorney, Agent, or Firm*—Millen, Raptes & White

[57] ABSTRACT

For decreasing the pollutants in automobile exhaust gases there is provided a catalyst containing a ceramic carrier such as alumina combined with manganese oxide and/or chromium oxide, and impregnated thereon a mixture of platinum and a metal oxide such as nickel, cobalt or iron oxides. An aluminum salt is preferably impregnated into the ceramic carrier, and then calcined to form an aluminum oxide layer, this step being conducted prior to the introduction of platinum.

11 Claims, No Drawings

CATALYST FOR CLEANING ENGINE EXHAUST GASES

BACKGROUND OF THE INVENTION

This invention relates to a catalyst and process for catalytically cleaning exhaust gases from internal combustion engines.

It is well recognized that exhaust gases from internal combustion engines contain carbon monoxide, a mixture of unburned or partially oxidized hydrocarbons (olefinic hydrocarbons, aldehydes, ketones, acids, etc.) formed by incomplete combustion of hydrocarbons, and nitrogen oxides generated at the high operating temperatures of modern engines.

It is generally admitted that hydrocarbons and carbon monoxide in the presence of oxygen react according to the following equations:

$$CO + \tfrac{1}{2} O_2 \longrightarrow CO_2$$

$$C_nH_m + (n+m/2)O_2 \longrightarrow nCO_2 + m/2\, H_2O.$$

The reduction of nitrogen oxides takes place by the following reaction:

$$2NO + CO \longrightarrow N_2 + CO_2$$

this reaction occurring even in the presence of oxygen.

Thus, to achieve effective pollution control, research has been centered on finding a catalyst capable of activating both (a) the oxidation of hydrocarbons and carbon monoxide; and (b) the reduction of nitrogen oxides. Such a catalyst must be effective during all stages of motor performance: starting, throttling down, acceleration, full throttling, even though the quantities and proportions of the different pollutants vary considerably from stage to stage. Furthermore, the catalyst must be active at a temperature of about 200° C. (initiation temperature) as well as at temperatures up to 900° C. and it must be resistant to thermal shocks. Still further, the desired catalyst must be relatively low in weight and volume, have a high resistance to mechanical shocks and to attrition due to vibrations. The catalyst, above all, must maintain its activity for thousands of miles without maintenance.

Whereas catalysts have been proposed containing platinum deposited on a ceramic carrier by impregnation, and which suitably eliminate carbon monoxide and unburned or partially oxidized hydrocarbons, such catalysts are not satisfactory with respect to the elimination of nitrogen oxides. Catalysts containing both platinum and nickel oxide as catalytic elements have also been tested. The latter catalyst eliminate carbon monoxide, hydrocarbons and nitrogen oxides. but, as observed, the conversion reactions are satisfactory only with carriers whose specific surface is high: about 80 $m^2/g$ as measured by the B.E.T. method described by S. Brunauer, P. Emmet and E. Teller in *J. Amer. Chem. Soc.*, 60, 309 (1938). It has been noted that the specific surface of this catalyst decreases during use and that this decrease in the specific surface results in an increased initiation temperature and corresponding decrease in the rate of pollutant elimination. Therefore, after a period of operation, the initiation temperature becomes so high that the effect of the catalyst likewise becomes inadequate. Furthermore, when the specific surface of the catalyst decreases, the mechanical strength of the catalyst, more particularly its attrition resistance decreases; it thus tends to become pulverulent and lose mass.

It has also been proposed to use catalysts comprised of a ceramic carrier containing alumina and/or aluminosilicates and/or silica and manganese oxide, on which platinum is deposited by impregnation. Such catalysts containing only manganese oxide and platinum as catalyst components, though effective for petroleum reforming of hydrocarbons, are unsatisfactory for the cleaning of exhaust gases.

SUMMARY OF THE INVENTION

A principal object of this invention, therefore, is to provide a novel and improved catalyst for simultaneously converting:

a. hydrocarbons and carbon monoxide to carbon dioxide, and b. nitrogen oxides to nitrogen, as well as processes for the production of such a catalyst.

Another object is to provide a method of employing the catalyst for cleaning exhaust emissions from internal combustion engines operating on hydrocarbon fuels.

Still another object is to provide the catalyst in a housing suitable for attachment to the exhaust line of a motor vehicle.

Upon further study of the specification and appended claims, the objects and advantages of the invention will become apparent.

To attain these objects, there is provided a catalyst consisting essentially of:

a. generally 80 to 95, preferably 88 to 92% of a ceramic carrier consisting essentially of a fired intimate mixture of (all percentages are on a weight basis):

i. generally 55 to 98, preferably 85 to 92% of a refractory member selected from the group consisting of an alumina, an aluminosilicate, a silicate, and mixtures thereof; and ii. generally 2 to 45, preferably 8 to 15% of a catalyst member selected from the group consisting of manganese oxide chromium oxide and mixtures thereof; and b. generally 5 to 20, preferably 8 to 12% of impregnated catalyst components consisting essentially of:

i. generally 0.025 to 1, preferably 0.05 to 0.4% of platinum;

ii. generally 50 to 99.975, preferably 99 to 99.95% of a metal oxide;

iii. generally 0 to 49% preferably 0% of manganese oxide, chromium oxide, and mixtures thereof, the proportions of the components in the total being as follows:

| | Component | General % | Preferred % |
|---|---|---|---|
| a | refractory member | 40 – 90 | 75 – 85 |
| b | an oxide of manganese or chromium or mixtures thereof | 2 – 40 | 8 – 15 |
| c | platinum | 0.005 – 0.05 | 0.01 – 0.02 |
| d | an oxide of iron nickel or cobalt or mixtures thereof | 5 – 20 | 8 – 12 |

The percentages of manganese oxide and chromium oxide are respectively calculated as $MnO_2$ and $Cr_2O_3$.

In any case, although carriers having a specific surface higher than 30 $m^2/g$ are usable, it is an advantage of this invention to employ carriers having a specific surface as low as possible, particularly of not more than 4 $m^2/g$ and less.

Another advantage of the invention is that low platinum contents are sufficient. The content of the finished catalyst ranges between 0.005 and 0.05% by weight. A lower platinum contents, insufficient catalytic action is obtained, and for higher contents the conversion rate of hydrocarbons and carbon monoxide to $CO_2$ is no more improved and the conversion of nitrogen oxides to nitrogen, in the presence of oxygen, tends to decrease.

Thus, it was found that the simultaneous presence in the catalyst of a small quantity of platinum, at least an oxide of a metal of the group Fe, Ni and Co and of at least an oxide of Mn or Cr results in a satisfactory reduction of pollutants, i.e. allows both the hydrocarbons and carbon monoxide to be oxidized and the nitrogen oxides to be reduced in the presence of air.

Furthermore, when manganese oxide, chromium oxide or both are present in the ceramic carrier, the catalytic activity of the catalyst is sufficient even with a carrier having a specific surface lower than 30 $m^2/g$, and of equal or greater importance, the activity of the catalyst does not noticeably decrease when the specific surface decreases during operation. Such catalyst carriers having a reduced specific surface are also more easily prepared and their mechanical properties are better. As the firing temperature can be higher, the resultant carrier is more cohesive, and exhibits an improved resistance to attrition. Furthermore, the firing reaction being more complete, the reproductability of the catalyst is ameliorated and a ceramic state is obtained in which the nature and geometry of crystalline structures and pores does not change due to the repeated action of temperature variations during catalyst performance. Thus, by "firing" or "fired" in the context of this invention is meant heating or heated at a temperature higher than 800°C and preferably higher than 1 100°C.

The oxides of Fe, Ni and/or Co represent 5 to 20% by weight of the catalyst, preferably 8 to 12% and the oxides of Mn and/or Cr 2 to 40%, preferably 8 to 15% by weight. For values lower than the ranges given hereinabove, the efficiency of the catalyst is impracticable, and at higher values, the activity does not increase noticeably, and therefore there is no significant advantage in using more of the costly components.

The efficiency of the oxides of the metals of group Ni, Fe, Co in the catalyst of the invention, more particularly for eliminating nitrogen oxides increases in the following order: Co < Fe < Ni: consequently, catalyst containing a major amount of, especially all of, nickel oxide are preferable used.

The catalytic efficiency of Mn is higher than that of Cr, and the shaping of the carrier is easier when oxide of manganese is present. Thus, the preferred catalyst contain a major amount of, especially all, manganese.

Thus, the most preferred catalysts contain nickel and manganese to the substantial, if not complete, exclusion of their equivalent oxides. Accordingly, it is preferred that the 8 to 12% of the oxides of FE, Ni and/or Co be comprised of at least a major amount of NiO, and the 8 to 15% of the oxides of Mn and/or Cr comprise at least a major amount of manganese oxide.

To manufacture the catalyst, a carrier is prepared and then impregnated.

The carrier is prepared by forming a ceramic paste which is shaped and fired. The paste is prepared by mixing oxides of manganese and/or chromium with aluminum oxide, more particularly α-alumina, alumina hydroxide, and binders in order to facilitate the shaping operations. Inorganic binders can be used such as aluminum silicate, for example clay or kaolin, or magnesium silicate for example steatite.

It is also optional to add other refractory oxides such as $TiO_2$, $ZrO_2$ or $W_2O_3$ to the paste in order to modify the shaping and firing conditions of the ceramic constituents, in particular the firing temperature.

Whereas a portion of the oxides of manganese and/or chromium can be introduced in the ceramic paste, it is preferred for all of it to be introduced at this point.

According to the nature of the ceramic constituents organic binders such as carboxymethyl cellulose, alginates, thermoplastic material such as polystyrene or polyvinyl chloride are added in order to facilitate shaping operations and are destroyed by firing. Shaping can be performed by conventional techniques such as compacting, spinning or hot extrusion. When the paste contains silicates or aluminosilicates such as clay, kaolin, steatite, the use of organic binders can often be spared.

The shaped paste is fired at temperature ranging from about 800° to 1400°C., at least preferably 1100°C. The carrier can have different shapes : balls, pellets, rings, cylinders, thin-walled tubular prisms having a simple polygonal section. The carrier can be used in bulk in the reactor or it can be agglomerated by heating or by means of a binder in order to give pieces having definite shapes. This shape is selected so as to have the maximum contact surface with exhaust gases and the minimum resistance to gases. The honeycomb structure is particularly suitable.

Next, the prepared support is submitted to at least two impregnations : one to introduce oxide(s) of the metals of the group Fe, Ni, Co and the other introduce platinum. If all of the oxides of Mn and/or Cr have not been introduced in the carrier as a ceramic constituent, a further impregnation is performed in order to introduce the remainder of these oxides. Impregnation by the oxide(s) of metals of the group Fe, Ni, Co and by the oxide(s) of Mn and/or Cr is performed with an aqueous solution of a water soluble salt decomposable at low temperature such as oxalate, formate, acetate or more often nitrate. The carrier is preferably immersed in the solution, but it can be also sprayed. Afterwards, the carrier is drained, dried in furnace, and calcined at temperatures ranging between about 400° and 600°C. in order to convert the salts into oxides. The impregnation operation can be repeated as often as necessary according to the carrier porosity and to the desired oxide content.

Impregnation with platinum takes place preferably after impregnation by the other catalytic elements. It is, for example, performed by immersing in or spraying the carrier with a solution of platinum compound which is reduceable to metal such as ammonium or alkali chloroplatinates or, preferably, chloroplatinic acid. Next, the carrier is dried, for example, in a furnace, and treated with a reducing agent, such as a formol solution. To obtain substantial homogeneity, the quantity of the solution of platinum compound and of reducing agent are selected by considering the porosity of the carrier and the desired platinum content. The excess of solution is eliminated by draining or blowing off. Any other impregnation process resulting in a uniform distribution of platinum on the carrier can also be used.

According to a preferred embodiment of the catalyst manufacturing process, the ceramic support prior to platinum impregnation is further impregnated with an aluminum salt capable of being converted to alumina at under 600°C. It has been found that when performing such an additional impregnation, the catalyst obtained has a lower initiating temperature, the time elapsed before working (the induction period) is shortened, and the efficiency of a new or used catalyst is increased. It seems that alumina so deposited has not catalytic action itself, but it brings about a better distribution and fixation of platinum.

The impregnation with an aluminum salt is performed before impregnation with a platinum compound and preferably is conducted together with the impregnation of the oxide(s) of the metals of the group Fe, Ni, Co, but it can also be conducted beforehand. A water-soluble aluminum salt, decomposable at rather low temperatures, e.g. oxalate, formate, acetate or more often nitrate, preferably is used. The carrier is immersed in or sprayed with an aqueous solution of aluminum salt, preferably a saturated solution. The carrier is next drained, dried in a furnace and calcined at a temperature ranging between about 400°C. and 600°C. in order to convert the salt into alumina. When performing simultaneous impregnation with an aluminum salt and with a salt of a metal of the group Fe, Ni, Co, the carrier is immersed in or sprayed with a solution containing salts of the above different metals and in this case it is preferred that the same anion is used for all salts, e.g. acetate. The quantity of alumina deposited can have any value up to 12%, but is preferably higher than 3%, based on the weight of the total catalyst.

After calcination of the carrier impregnated by an aluminum salt, its specific surface is increased by from 10 to 40 m²/g (as measured by the B.E.T. method), preferably by from 15 to 30 m²/g with respect to the carrier. After a rather short period of operation (for example, after a 1000 km run on an automotive vehicle) the specific surface of the catalyst is decreased to a value approximating that of the original carrier; however, catalytic activity does not decrease significantly and remains within specifications.

For application to exhaust gas purification, the catalyst is placed in a reactor which is fitted in the exhaust system of the motor. The air necessary for destroying polluting agents is preferably provided by a compressor actuated by the motor. The introduced air can optionally be preheated, for example, in a heat exchanger adjoining or surrounding the reactor. The air can be introduced upstream of the reactor, or into the reactor at a distance downstream from the exhaust gas inlet so that the air is in contact with the only part of the catalyst. These two methods of introduction can be combined.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE 1

Catalyst Preparation

Carriers having the following composition were prepared.

| No. | Composition | % in Weight | Firing Temperature (°C.) | Specific Surface (m²/g) |
|---|---|---|---|---|
| 1. | $Al_2O_3$ | 98% | 1250 | 4 |
|    | $TiO_2$ | 1 | | |
|    | $MnO_2$ | 1 | | |
| 2. | $Al_2O_3$ | 98 | 1250–1320 | 4 |
|    | $MnO_2$ | 2 | | |
| 3. | $Al_2O_3$ | 90 | 1250–1320 | 4 |
|    | $MnO_2$ | 10 | | |
| 4. | $Al_2O_3$ | 90 | 1250–1320 | 4 |
|    | $Cr_2O_3$ | 10 | | |
| 5. | Clay | 20 | 1250 | 4 |
|    | $MnO_2$ | 10 | | |
|    | $Al_2O_3$ | 70 | | |
| 6. | Kaolin | 90 | 800 | |
|    | $MnO_2$ | 10 | | |

The preparation of the paste of composition 3 for spinning full cylinder and honeycomb carriers is given hereunder.

| | | |
|---|---|---|
| For spinning full cylinders | | |
| Alcan C 72 FG alumina | 90% | |
| Pyrolusite | 10% | |
| Mixing additive and binder (water and 3% of ammonium alginate) | 20% | of ceramic substance |
| For spinning honeycomb carrier | | |
| Alcan C 72 FG alumina | 90% | |
| Pyrolusite | 10% | |
| Polystyrene | 20% | of ceramic substance |
| Glycol stearate | 5% | of ceramic substance |

The paste was hot kneaded and spinned at 100° C.

The paste for the honeycomb carrier was spinned into prisms having a hexagonal section measuring 10 mm from one face to the opposite face and subdivided by walls of 0.3 mm thickness into equilateral triangles of 2.5 mm in height in order to form the honeycomb. These hexagonal prisms were joined together to form hexagonal prisms of 90 mm from face to face and 45 mm in thickness.

Impregnation of the Carrier

The resultant carrier was immersed for an hour in an aqueous solution of nickel nitrate containing 200 g/l Ni and maintained at a temperature of 75° C. It was then drained to eliminate the excess of solution held by capillarity in the cells of the honeycomb, dried at 110° C.

for one hour in an electric furnace, and heated at 450°C. for two hours in a muffle furnace. The analysis of a specimen fragment showed that 6.2% of nickel had been deposited.

The carrier was calcined at 500°C. and further impregnated with a diluted solution (175 g/l of Ni) at 50°C. and dried as above. The total quantity of Ni deposited reached then 9.8%. The carrier was again calcined at 500°C.

A solution of chloroplatinic acid containing 0.95 g/l of Pt was prepared and the carrier was immersed in it for 30 minutes. After draining and drying at 150°C., the carrier was contacted with a 10% by weight formol solution. It was then drained and subsequently dried at 150°C. for two hours. Thus, 0.02% of platinum was deposited.

EXAMPLE 2

Emission Tests

A catalytic reactor for cleaning exhaust gases was adapted to the exhaust system of a Renault type R4 automobile. This reactor was constructed of a stainless steel cylinder of 250 mm in length and 110 mm in diameter, and it is used to contain the catalyst.

Fresh air was injected into the exhaust system at a point 20 cm upstream of the reactor by means of an air compressor run by the motor and able to provide 2 m³/h at 1000 revolutions per minute.

The reactor was fitted with instruments for measuring input and output temperatures and pressures.

Test 1

A charge of 1 liter of catalyst composed of balls of γ-alumina of a diameter of 5 mm and a specific surface of 192 m²/g impregnated with:
    9.8% of Ni
    0.02% of Pt
was introduced into the reactor.

The following bench test cycle with the motor was performed; starting, run at 2000 rpm with an output of 5 horsepower for 5 minutes, stopping, and cooliing of the reactor. After a run of sufficient cycles, equivalent to a distance of 3000 km, the test was stopped. The loss of weight due to attrition amounted to 8.3%. The measured specific surface was 8 m²/g.

Test 2

A charge of 1 liter of catalyst composed of α-alumina cylinders having a diameter of 8 mm, a length of 10 mm and a specific surface of 10 m²/g and impregnated with:
    9.7% Ni
    0.02% Pt
was introduced in the reactor.

The operating conditions were the same as in Example 1. The initiation temperature (the temperature at which the concentration of CO in the exhaust gas decreases to below 2%) was measured to indicate the activity of the catalyst. For this measurement, the outlet temperature of the reactor and the CO concentration of the gas were recorded.

At an air injection rate of 1.8 m³/h of fresh air per 1000 rpm in the exhaust system, the initiation temperature was, after one cycle, 220° C. The average increase was 15° C. per cycle and after 9 cycles, the reaction could not be initiated at 354°C., the upper limit of the test motor under the test conditions.

Test 3

The operating conditions were the same as in Test 2. The catalyst used was composed of cylinders 8 mm in diameter and 10 mm in length, a specific surface of 4 1 m²/g, having a chemical composition of carrier No. 3 and impregnated with:
    9.9% Ni
    0.02% Pt
The initiation temperature after one cycle was 227°C. After 20 cycles, it was still 240°C.

Test 4

The conditions were the same as in Test 2. The catalyst was composed of a carrier of composition No. 4 impregnated with:
    9.6% Ni
    0.02% Pt
The initiation temperature was 270°C. After 9 cycles, it was still 300°C.

Test 5

Into the reactor there is introduced a charge of 1 liter of catalyst composed of honeycomb hexagonal prisms carriers having a height from face to face of 10 mm and a length of 10 mm, having the carrier composition No. 3 and impregnated with:
    9.9% Fe
    0.02% Pt With a running engine corresponding to a cruising speed of 60 km/h, the conversion rates were the following:

(HC : hydrocarbons, NO : nitrogen oxides)

| | | | |
|---|---|---|---|
| CO inlet : | 4 % | CO outlet : | 0.14 % |
| HC inlet : | 60 ppm | HC outlet : | 30 ppm |
| NO inlet : | 200 ppm | NO outlet : | 75 ppm |

The % and ppm are on the basis of

Test 6

Into the cylindrical reactor were disposed 3 ceramic pieces having hexagonal sections, constituted by hexagonal honeycomb cells having a height from face to face of 10 mm and a length of 45 mm, agglomerated in order to form a hexagonal prism of 90 mm height from face to face and 45 mm thickness. The 3 ceramic pieces were fixed, one behind the other, in the cylindrical reactor by means of an impervious mastic sold under the trademark "Kerlane". The pieces were spaced apart from one another by 20 mm. The carrier had composition No. 3 and was impregnated with:
    10.1% Ni
    0.02% Pt Air was injected into the exhaust system at a rate of 1.8 m³/h per 1000 rpm.

After a 3000 km run, the following results were observed:

| | | | |
|---|---|---|---|
| a | Carbon monoxide | CO inlet % | CO outlet % |
| | 90 km/h flat run at uniform speed | 4.1 | 0.16 |
| | 60 km/h speed run | 3.7 | 0.16 |
| | motor throttled down | 4.7 | 0.19 |
| | acceleration at 60 km/h | 4.6 | 0.22 |
| | deceleration at 60 km/h | 2.0 | 0.11 |
| b | Unburned hydrocarbons | HC inlet ppm | HC outlet ppm |
| | 90 km/h flat run at uniform speed | 70 | 23 |
| | 60 km/h flat run at uniform speed | 60 | 22 |
| | motor throttled down | 110 | 40 |
| | acceleration at 60 km/h | 120 | 42 |
| | deceleration at 60 km/h | 500 | 150 |
| c | Nitrogen oxides | NO inlet ppm | NO outlet ppm |
| | 90 km/h flat run at uniform speed | 400 | 75 |

-Continued

| | | |
|---|---|---|
| 60 km/h flat run at uniform speed | 200 | 40 |
| motor throttled down | 49 | 5 |
| acceleration at 60 km/h | 770 | 290 |
| deceleration at 60 km/h | 90 | 25 |

The inlet temperature of the gas varied between 275° and 380°C. and the outlet temperature between 360°C. and 480°C. The pressure drop in the reactor was at most 52 mm Hg (acceleration at 100 km/h). The gasoline employed had a density of 0.775 (15°C.), contained no lead and was composed of 50.40% of aromatic hydrocarbons, the remaining being saturated aliphatic hydrocarbons. The difference between the rate of conversion of pollutants in the presence of a new catalyst and after a 3000 km run was less than experimental error (5%).

Test 7

This test was performed with the same device as Test 6 except that:

a. the reactor contained 4 ceramic pieces instead of 3 b. the quantity of injected air was 2.2 m³/h. per 1000 rpm, 50% of this air being injected 20 cm upstream of the reactor as in Test 6, and 50% between the third and fourth ceramic piece.

The rates of conversion of carbon monoxide and unburned hydrocarbons were the same as in Test 6. For nitrogen oxides, the results were the following:

| | NO inlet ppm | No inlet ppm |
|---|---|---|
| 90 km/h flat run at uniform speed | 360 | 54 |
| 60 km/h flat run at uniform speed | 210 | 22 |
| motor throttled down | 45 | 5 |
| acceleration at 60 km/h | 830 | 110 |
| deceleration at 60 km/h | 100 | 12 |

Test 9

A first monolithic honeycomb ceramic carrier A having a diameter of 28 mm and a height of 46 mm and having a carrier composition No. 3 was submitted to the following treatment. It was immersed for 3 hours in an aqueous solution of nickel and aluminum nitrates containing 100 g/l of nickel (calculated as Ni) and 105 g/l aluminum (calculated as $Al_2O_3$). The impregnated carrier was dried at 100° C., and then calcined at 425° C. The steps of immersing, drying and calcining were repeated twice. Thus, the total quantity of nickel and alumina deposited was 9%, Ni by itself consisting of 4.3%.

The carrier was then immersed for 90 minutes at room temperature in a chloroplatinic acid solution containing 2 g/l of Pt. It was dried at 110° and then treated by a formol solution. The quantity of platinum deposited was 0.05%.

A second monolithic carrier B having the same dimensions and composition as monolithic carrier A was submitted to the same treatment except that the first impregnation was performed with a solution containing only nickel nitrate (200 g/l of Ni). The quantity of Ni deposited was 6.25%.

The two monolithic catalysts were tested in a laboratory reactor fed with motor exhaust gases mixed with air and heated to 300°C. The exhaust gas contained 4.5% carbon monoxide and 5% oxygen and the rate of introduction was 1.4 m³/h. The initiation temperature and the induction time were measured, the initiation temperature being the temperature T, at which the carbon monoxide content of the outlet gas begins to decrease, and the induction time being time $t$, calculated from the moment when the catalyst had reached the temperature T, required for the carbon monoxide content to be lowered to less than 0.1%, the catalyst being heated only by the exhaust gases.

The monolithic catalysts A and B were tested, both in a new condition and after an aging treatment corresponding to 1000 km in a bench motor having a displacement capacity of 845 cm³, operating at 2500 rpm and having a brake horsepower of 3. The aging was obtained by submitting the catalyst to the following cycle: the motor was run for 30 minutes and then stopped for 30 minutes, the gas rate through the monolithic catalyst being 1.03 m³/h, and the quantity of air injected into the exhaust gas being 20% by volume.

The results were as follows:

| Monolithic catalyst | A | B |
|---|---|---|
| in a new condition | | |
| B.E.T. surface | 29.1 m²/g | 5.8 m²/g |
| T | 180° C. | 200° C. |
| t | 50s | 50s |
| After 1000 km aging | | |
| B.E.T. surface | 6 m²/g | 5 m²/g |
| T | 200° C. | 215° C. |
| t | 80s | 240s |

Test 10

Five monolithic catalysts prepared as monolithic catalyst A of Test 9, having the form of hexagonal prisms having a height from face to face of 36 mm and a thickness of 36 mm were set by refractory felt in a reactor separated into two parts (a) and (b), two monolithic catalysts being set in part (a) and three in part (b). The reactor was disposed in the exhaust system of a Renault type R 1152 (R 16) car at the place of the original exhaust pot, the part (a) being on the motor side and part (b) on the outlet side. The car was also provided with a centrifugal compressor run by a belt coming off the motor and delivering air at a rate of 7 m³/h per 1000 rpm. The air was injected at the inlet of the reactor (20% vol) and between part (a) and part (b) (80% vol).

The car was tested on a bench according to the specifications of C.V.S. 72 of the Federal Register (USA), volume 35, No. 219, of Nov. 10, 1970. The catalyst was used for 1000 km before the test. A non-equipped car was tested under the same conditions. Running a cycle with a hot motor according to the above specifications, the results were as follows, the values representing grams per mile, the hydrocarbons being calculated as propane and the nitrogen oxides as $NO_2$.

| Car | non-equipped | equipped |
|---|---|---|
| carbon monoxide | 57.6 | 0.01 |
| hydrocarbons | 2.37 | 0.060 |
| nitrogen oxides | 1.84 | 0.27 |

Running a cycle with a cold motor according to the above specifications, the results with an equipped car were as follows:

| | |
|---|---|
| CO | 5.94 g per mile |
| hydrocarbons | 0.64 g per mile |
| nitrogen oxides | 0.44 g per mile |

In both cases, the carburetor and the ignition system were standard, and the motor was tuned in accordance with the manufacturer's specifications.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A catalyst suitable for reducing the content of pollutants in engine exhaust gases, said catalyst consisting essentially of in percent by weight:
   a. 80 to 95% of a ceramic carrier consisting essentially of a fired intimate mixture of:
      i. 55 to 98% of a refractory member selected from the group consisting of alumina, aluminosilicate, magnesium silicate and mixtures thereof,
      ii. 2 to 45% of a catalyst member selected from the group consisting of manganese oxide, chromium oxide and mixtures thereof; and
   b. 5 to 20% catalyst components lying on the surface of said carrier, said catalyst components consisting essentially of:
      i. 0.025 to 1% of platinum
      ii. 50 to 99.975% of a metal oxide selected from the group consisting of nickel oxide, cobalt oxide, iron oxide and mixtures thereof; and
      iii. 0 to 49% of manganese oxide, chromium oxide and mixtures thereof,
      said refractory catalyst member and on an overall basis consisting essentially of in percent by weight:
         40–90% of said refractory member to 40% of manganese oxide, chromium oxide, or mixtures thereof,
         0.005 to 0.05% of platinum, and
         5 to 20% of nickel oxide, cobalt oxide, iron oxide or mixtures thereof.

2. A catalyst according to claim 1, containing nickel oxide.

3. A catalyst according to claim 1, containing manganese oxide.

4. A catalyst according to claim 2, containing manganese oxide.

5. A catalyst according to claim 1, wherein the ceramic carrier has a specific surface lower than 30 m$^2$/g.

6. A catalyst according to claim 1, wherein the catalyst on an overall basis comprises on a percent by weight basis 8 to 12% of an oxide of Fe, Ni or Co or mixtures thereof and 8 to 15% of an oxide of Mn or Cr or mixtures thereof.

7. A catalyst according to claim 6, wherein said 8 to 12% is comprised of at least a major amount of NiO and wherein said 8 to 15% is comprised of at least a major amount of manganese oxide.

8. A catalyst as defined by claim 1, said ceramic carrier having deposited thereon aluminum oxide aluminum oxide.

9. A catalyst as defined by claim 8, said deposited aluminum oxide comprising on an overall basis 3 to 12% by weight of the catalyst.

10. A catalyst as defined by claim 8, said carrier having deposited thereon said aluminum oxide prior to depositing thereon said platinum.

11. A catalyst according to claim 1, wherein said refractory member consists essentially of alumina.

* * * * *

UNITED STATES PATENT OFFICE
CERTIFICATE OF CORRECTION

PATENT NO. : 3,881,696
DATED : May 6, 1975
INVENTOR(S) : Jean-Michel Lepeytre et al It is certified that error appears in the above-identified patent and that said Letters Patent are hereby corrected as shown below:

Claim 1, column 11, line 33 to column 12, line 6, delete these lines in their entirety and substitute therefor:

-- iii. 0 to 49% of manganese oxide, chromium oxide and mixtures thereof,
   said refractory member and catalyst on an overall basis consisting essentially of in percent by weight:
   40-90% of said refractory member,
   2 to 40% of manganese oxide, chromium oxide, or mixtures thereof,
   0.005 to 0.05% of platinum, and
   5 to 20% of nickel oxide, cobalt oxide, iron oxide or mixtures thereof.--

Claim 8, column 12, line 26, delete "aluminum oxide".

Signed and Sealed this seventh Day of October 1975

[SEAL]

Attest:

RUTH C. MASON
Attesting Officer

C. MARSHALL DANN
Commissioner of Patents and Trademarks